(12) United States Patent
Yamane et al.

(10) Patent No.: US 11,553,052 B2
(45) Date of Patent: Jan. 10, 2023

(54) INFORMATION PROCESSING APPARATUS, SYSTEM, AND IN-VEHICLE DEVICE

(71) Applicant: TOYOTA JIDOSHA KABUSHIKI KAISHA, Toyota (JP)

(72) Inventors: Josuke Yamane, Nisshin (JP); Naoya Oka, Nagakute (JP); Ryosuke Yamamoto, Nagoya (JP); Kaori Okuda, Ogaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 235 days.

(21) Appl. No.: 17/149,237

(22) Filed: Jan. 14, 2021

(65) Prior Publication Data

US 2021/0284103 A1 Sep. 16, 2021

(30) Foreign Application Priority Data

Mar. 11, 2020 (JP) .............................. JP2020-042069

(51) Int. Cl.
*H04W 4/021* (2018.01)
*H04L 67/52* (2022.01)
*H04W 4/40* (2018.01)
*H04W 4/024* (2018.01)
*G07F 17/20* (2006.01)
*H04L 67/51* (2022.01)
*H04L 51/52* (2022.01)
*B60R 16/023* (2006.01)
*B60S 3/04* (2006.01)

(52) U.S. Cl.
CPC ............. *H04L 67/52* (2022.05); *H04W 4/021* (2013.01)

(58) Field of Classification Search
CPC ............................... H04L 67/52; H04W 4/021
See application file for complete search history.

(56) References Cited

U.S. PATENT DOCUMENTS

| | | | | |
|---|---|---|---|---|
| 4,595,866 A | * | 6/1986 | Fukatsu | B60S 1/485 318/483 |
| 2013/0145839 A1 | * | 6/2013 | Niemann | G01N 29/2437 73/170.17 |
| 2016/0019526 A1 | * | 1/2016 | Granbery | G01S 1/00 705/26.81 |
| 2016/0339878 A1 | * | 11/2016 | Kracker | B60S 1/0862 |

FOREIGN PATENT DOCUMENTS

JP 2011-042253 A 3/2011

* cited by examiner

*Primary Examiner* — Chris Parry
*Assistant Examiner* — Hassan A Khan
(74) *Attorney, Agent, or Firm* — Sughrue Mion, PLLC

(57) ABSTRACT

A controller is provided which performs extracting a post related to a vehicle washing machine from posts to a social networking service, and transmitting, to a terminal of a user using the social networking service, information on a position of the vehicle washing machine and a type of the vehicle washing machine specified based on the extracted post.

15 Claims, 13 Drawing Sheets

| SNS ACCOUNT | POSITION | POST | VEHICLE ID |
|---|---|---|---|
| × × × | E1 | × × × | V11 |
| × × × | E2 | × × × | V12 |
| × × × | E3 | × × × | V13 |
| . . . | . . . | . . . | . . . |

Fig. 4

| VEHICLE ID | POSITION | SENSOR DATA |
|---|---|---|
| V11 | E1 | G1 |
| V12 | E2 | G2 |
| V13 | E3 | G3 |
| ... | ... | ... |

Fig. 5

| VEHICLE WASHING MACHINE ID | POSITION | TYPE | EVALUATION |
|---|---|---|---|
| F11 | E1 | H1 | × × × |
| F12 | E2 | H2 | × × × |
| F13 | E3 | H3 | × × × |
| . . . | . . . | . . . | . . . |

Fig. 6

INFORMATION PROCESSING APPARATUS, SYSTEM, AND IN-VEHICLE DEVICE

CROSS REFERENCE TO RELATED APPLICATION

This application claims the benefit of Japanese Patent Application No. 2020-042069, filed on Mar. 11, 2020, which is hereby incorporated by reference herein in its entirety.

BACKGROUND

Technical Field

The present disclosure relates to an information processing apparatus, a system, and an in-vehicle device.

Description of the Related Art

It is known that vehicle washing machine information is set via a portable terminal so that a vehicle is washed by using the vehicle washing information thus set after refueling (for example, see Patent Literature 1).

CITATION LIST

Patent Literature

Patent Literature 1: Japanese Patent Application Laid-Open Publication No. 2011-042253

SUMMARY

An object of the present disclosure is to provide a user with information related to a vehicle washing machine.

One aspect of the present disclosure is an information processing apparatus including a controller configured to execute:
extracting a post related to a vehicle washing machine from posts to a social networking service; and
transmitting, to a terminal of a user using the social networking service, information on a position of the vehicle washing machine and information on a type of the vehicle washing machine specified based on the post thus extracted.

Another aspect of the present disclosure is a system including:
a terminal of a user capable of using a social networking service; and
a server with a controller configured to manage the social networking service;
wherein the controller is configured to execute:
extracting a post related to a vehicle washing machine from posts submitted from the terminal of the user to the social networking service; and transmitting, to the terminal of the user using the social networking service, information on a position of the vehicle washing machine and information on a type of the vehicle washing machine specified based on the post thus extracted.

A further aspect of the present disclosure is an in-vehicle device including:
a sensor configured to detect a situation of a vehicle or a situation around the vehicle that changes during vehicle washing by a vehicle washing machine;
and a controller configured to transmit a detection value of the sensor to a server when it is determined based on the detection value of the sensor that the vehicle washing by the vehicle washing machine is being performed.

A still further aspect of the present disclosure is an information processing method for causing a computer to execute the processing of the information processing apparatus, the system, or the in-vehicle device. In addition, a yet further aspect of the present disclosure is a program that causes a computer to execute the processing of the information processing apparatus, the system or the in-vehicle device, or is a storage medium that has stored the program in a non-transitory manner.

According to the present disclosure, it is possible to provide a user with information related to a vehicle washing machine.

BRIEF DESCRIPTION OF THE DRAWINGS

FIG. 4 is a diagram illustrating an example of a table structure of SNS information.

FIG. 5 is a diagram illustrating an example of a table structure of sensor data;

FIG. 6 is a diagram illustrating an example of a table structure of vehicle washing machine information;

DESCRIPTION OF THE EMBODIMENTS

A controller included in an information processing apparatus, which is one aspect of the present disclosure, extracts a post or contribution related to a vehicle washing machine from posts or contributions to a social networking service. The post related to the vehicle washing machine may be, for example, a post including a predetermined keyword indicating that the vehicle washing machine has been used. This post may include a message, a still image, a moving image (video), or audio. Also, the post may include position information of the vehicle washing machine, information on the type of the vehicle washing machine, or information on an evaluation or rating of the vehicle washing machine.

In addition, the controller transmits information on the position of the vehicle washing machine and information on the type of the vehicle washing machine, which are specified based on the extracted post, to a terminal of a user who uses the social networking service (SNS). The position of the vehicle washing machine and the type of the vehicle washing machine can be specified based on the post to the SNS as described above, or can be specified based on information transmitted from an in-vehicle device mounted on a vehicle.

The terminal of the user receives the information on the position of the vehicle washing machine and the information on the type of the vehicle washing machine, whereby the user can know the position of the vehicle washing machine and the type of the vehicle washing machine through the terminal of the user. For example, the position of the vehicle washing machine and the type of the vehicle washing machine can be displayed on a map on the terminal of the user. In this way, the user can know the position of the vehicle washing machine and the type of the vehicle washing machine, so that the user can select and use a desired vehicle washing machine.

Hereinafter, embodiments of the present disclosure will be described based on the accompanying drawings. The configurations of the following embodiments are some examples, and the present disclosure is not limited to the configurations of the embodiments. In addition, the following embodiments can be combined with each other as much as possible.

First Embodiment

Figure 1:
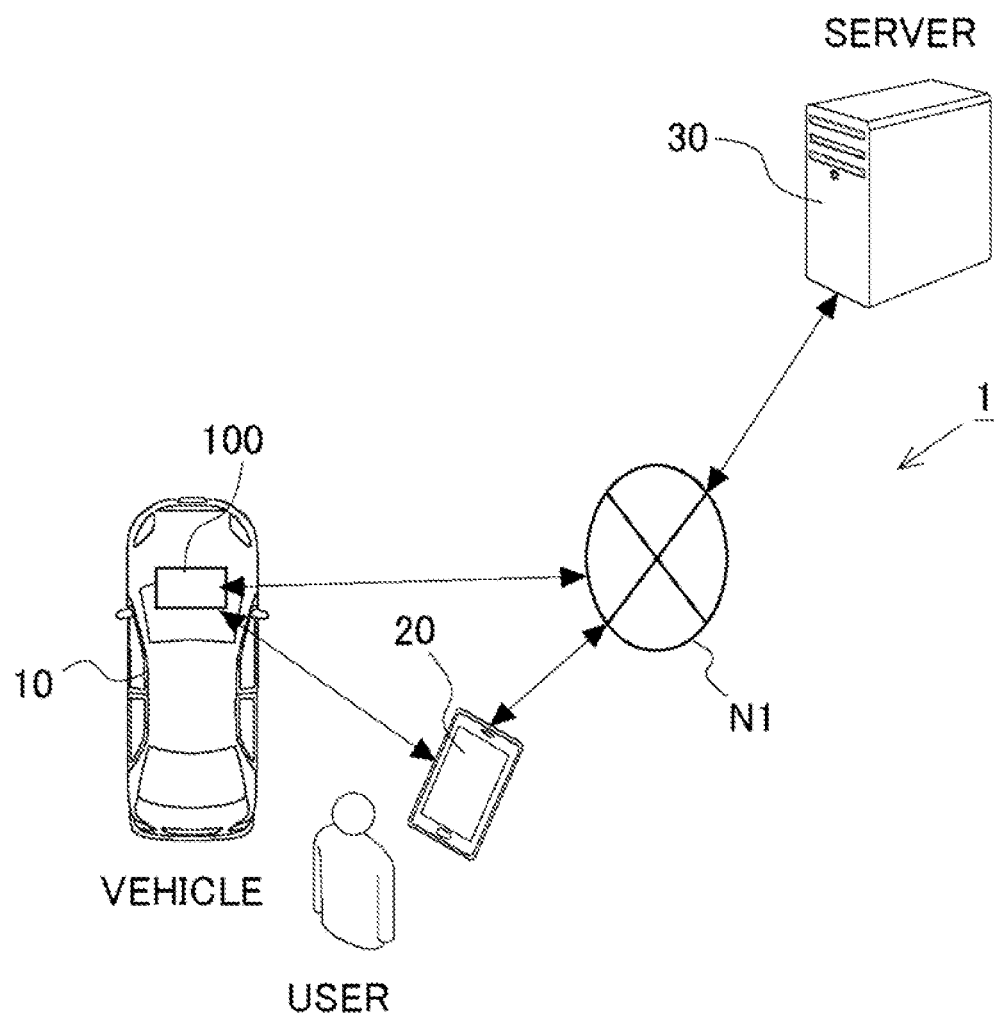
FIG. 1 is a view illustrating a schematic configuration of a system according to an embodiment.

FIG. 1 is a view illustrating a schematic configuration of a system 1 according to a first embodiment of the present disclosure. In cases where a user submits a post on a vehicle washing machine to an SNS, the system 1 collects information on the position of the vehicle washing machine, the type of the vehicle washing machine and the like, and displays these pieces of information on a map. These pieces of information are published on the SNS. Therefore, a user terminal 20 carried by the user can confirm the position, the type and the like of the vehicle washing machine. The user terminal 20 is a terminal capable of posting to the SNS and browsing the SNS. The user is a user who has been registered in the SNS.

In the example of FIG. 1, the system 1 includes an in-vehicle device 100 mounted on a vehicle 10, the user terminal 20, and a server 30. The in-vehicle device 100, the user terminal 20, and the server 30 are connected to one another by a network N1. Here, note that the network N1 is, for example, a global public communication network such as the Internet, but a wide area network (WAN) or other communication networks may be employed. Also, the network N1 may include a telephone communication network such as a mobile phone or the like, and a wireless communication network such as Wi-Fi (registered trademark) or the like. In addition, the in-vehicle device 100 and the user terminal 20 may be connected to each other by short-range wireless communication such as Bluetooth (registered trademark) or the like. Here, note that FIG. 1 illustrates one user terminal 20 by way of example, but user terminals 20 are possessed by a plurality of users, respectively, and there are as many user terminals 20 as there are users. Moreover, FIG. 1 illustrates one vehicle 10 by way of example, but there may be a plurality of vehicles 10.

Figure 2:
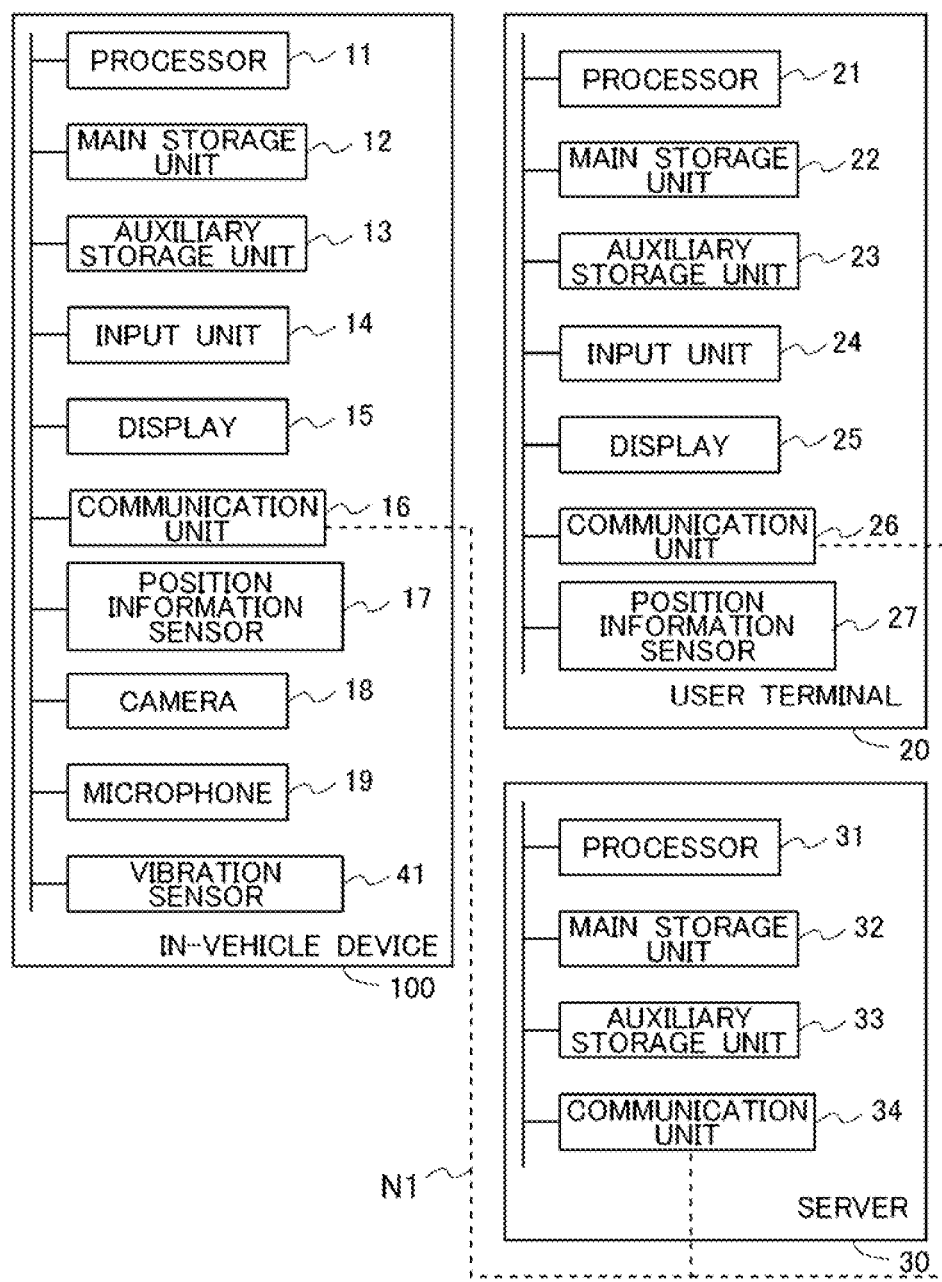
FIG. 2 is a block diagram schematically illustrating an example of a configuration of each of an in-vehicle device, a user terminal and a server, which together constitute a system according to the embodiment.

Hardware configurations and functional configurations of the in-vehicle device 100, the user terminal 20 and the server 30 will be described based on FIG. 2. FIG. 2 is a block diagram schematically illustrating one example of the configuration of each of the in-vehicle device 100, the user terminal 20 and the server 30, which together constitute the system 1 according to the present embodiment.

The server 30 has a configuration of a general computer. The server 30 includes a processor 31, a main storage unit 32, an auxiliary storage unit 33, and a communication unit 34. These components are connected to one another by means of a bus.

The processor 31 is a central processing unit (CPU), a digital signal processor (DSP), or the like. The processor 31 controls the user terminal 30, and performs various information processing operations. The processor 31 is an example of a controller. The main storage unit 32 is a random-access memory (RAM), a read only memory (ROM), or the like. The auxiliary storage unit 33 is an erasable programmable ROM (EPROM), a hard disk drive (HDD), a removable medium, or the like. The auxiliary storage unit 33 also stores an operating system (OS), various kinds of programs, various kinds of tables, and the like. The processor 31 loads a program stored in the auxiliary storage unit 33 into a work area of the main storage unit 32 and executes the program, so that each component or the like is controlled through the execution of the program. Thus, the server 30 realizes functions matching predetermined purposes, respectively. The auxiliary storage unit 33 is an example of a non-transitory storage medium. The main storage unit 32 and the auxiliary storage unit 33 are computer readable recording media. Here, note that the server 30 may be a single computer or a combination of a plurality of computers. In addition, the information stored in the auxiliary storage unit 33 may be stored in the main storage unit 32. Also, the information stored in the main storage unit 32 may be stored in the auxiliary storage unit 33.

The communication unit 34 is a means or unit that communicates with the in-vehicle device 100 and the user terminal 20 via the network N1. The communication unit 34 is, for example, a local area network (LAN) interface board or a radio or wireless communication circuit for radio or wireless communication (hereinafter, simply referred to as a wireless communication circuit). The LAN interface board and the wireless communication circuit are connected to the network N1.

Here, note that a series of processing executed by the sever 30 can be executed by hardware, but can also be executed by software.

Next, the user terminal 20 will be described. The user terminal 20 is, for example, a small computer such as a smart phone, a mobile phone, a tablet terminal, a personal information terminal, a wearable computer (such as a smart watch), a personal computer (PC), or the like. The user terminal 20 includes a processor 21, a main storage unit 22, an auxiliary storage unit 23, an input unit 24, a display 25, a communication unit 26, and a position information sensor 27. These components are connected to one another by a bus. The processor 21, the main storage unit 22 and the auxiliary storage unit 23 are the same as the processor 31, the main storage unit 32 and the auxiliary storage unit 33 of the server 30, and hence, the description thereof will be omitted.

The input unit 24 is a means or unit that receives an input operation performed by the user, and is, for example, a touch panel, a mouse, a keyboard, a push button, or the like. The display 25 is a means or unit that presents information to the user, and is, for example, a liquid crystal display (LCD), an electroluminescence (EL) panel, or the like. The input unit 24 and the display 25 may be configured as a single touch panel display. The communication unit 26 is a communication means or unit for connecting the user terminal 20 to the network N1. The communication unit 26 is, for example, a circuit for communicating with other devices (e.g., the in-vehicle device 100, the server 30 or the like) via the network N1 by making use of a mobile communication service (e.g., a telephone communication network such as 5G (5th Generation), 4G (4th Generation), 3G (3rd Generation), or LTE (Long Term Evolution)) or a wireless communication network such as Wi-Fi (registered trademark), Bluetooth (registered trademark) or the like.

The position information sensor 27 obtains position information (e.g., latitude and longitude) of the user terminal 20. The position information sensor 27 is, for example, a GPS (Global Positioning System) receiver unit, a wireless LAN communication unit, or the like. The position information obtained by the position information sensor 27 is transmitted to the server 30 when the user submits a post to the SNS.

Then, the in-vehicle device 100 of the vehicle 10 will be described. The in-vehicle device 100 includes a processor 11, a main storage unit 12, an auxiliary storage unit 13, an input unit 14, a display 15, a communication unit 16, a position information sensor 17, a camera 18, a microphone 19, and a vibration sensor 41. These components are connected to one another by a bus. The processor 11, the main storage unit 12, the auxiliary storage unit 13, the input unit 14, the display 15, and the communication unit 16 are the same as the processor 21, the main storage unit 22, the auxiliary storage unit 23, the input unit 24, the display 25, and the communication unit 26 of the user terminal 20, and hence, the description thereof will be omitted. Here, note that the processor 11 is an example of a controller. Also, the camera 18, the microphone 19 and the vibration sensor 41 are examples of a sensor. In addition, the camera 18, the microphone 19 and the vibration sensor 41 are examples of a "sensor configured to detect a situation of a vehicle or a situation around the vehicle that changes during vehicle washing by a vehicle washing machine".

The position information sensor 17 obtains position information (e.g., latitude and longitude) of the vehicle 10 at a predetermined cycle. The position information sensor 17 is, for example, a GPS (Global Positioning System) receiver unit, a wireless LAN communication unit, or the like. The information obtained by the position information sensor 17 is recorded, for example, in the auxiliary storage unit 13 or the like, and transmitted to the server 30. The camera 18 photographs the surroundings of the vehicle 10. The camera 18 photographs an image by using an imaging element such as a CCD (Charge Coupled Device) image sensor, a CMOS (Complementary Metal Oxide Semiconductor) image sensor or the like. The image obtained by photographing may be either a still image or a moving image. The microphone 19 is a means or unit for obtaining user's speech, and converts voice into an electric signal. The vibration sensor 41 is a sensor that detects the vibration of the vehicle 10, and is, for example, a gyro sensor.

Now, the functions of the server 30 will be described. The server 30 is to manage posting of users to the SNS, and provides the users with information related to vehicle washing machines. The server 30 can communicate with the in-vehicle devices 100 and the user terminals 20 via the network N1. The server 30 stores, in the auxiliary storage unit 33, posts of each user, positions where each user posted, and the like. The server 30 provides information on the SNS based on a request from each user terminal 20.

Figure 3:
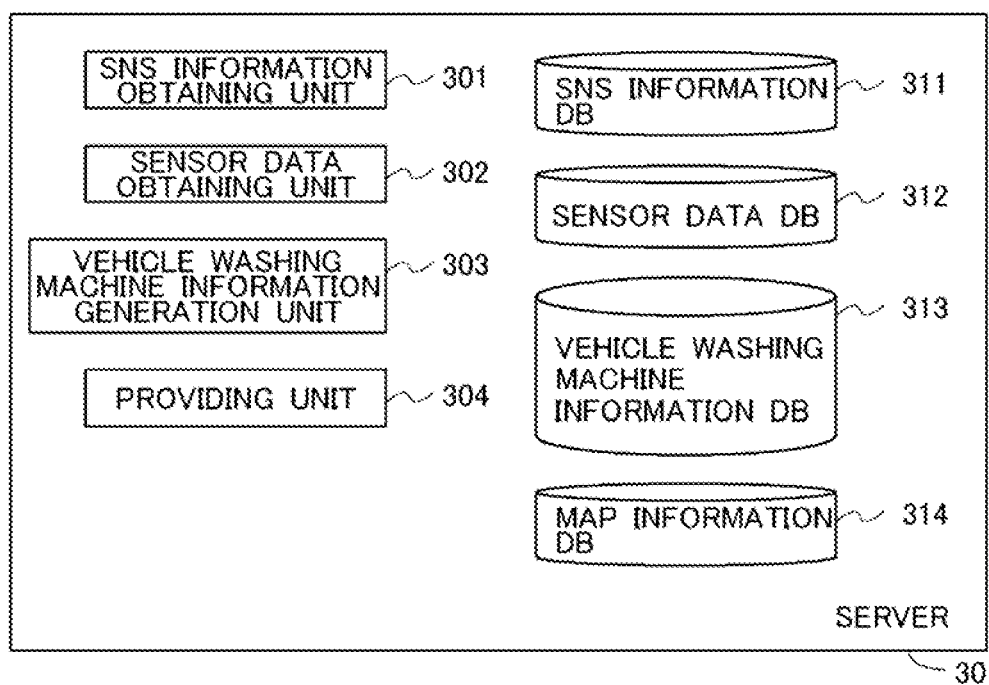
FIG. 3 is a view illustrating an example of a functional configuration of the server.

FIG. 3 is a view illustrating an example of a functional configuration of the server 30. The server 30 includes, as functional components, an SNS information obtaining unit 301, a sensor data obtaining unit 302, a vehicle washing machine information generation unit 303, a providing unit 304, an SNS information DB 311, a sensor data DB 312, a vehicle washing machine information DB 313, and a map information DB 314. The processor 31 of the server 30 executes the processing of the SNS information obtaining unit 301, the sensor data obtaining unit 302, the vehicle washing machine information generation unit 303, and the providing unit 304 by running a computer program on the main storage unit 32. However, any of the functional components or a part of the processing thereof may be executed by a hardware circuit.

The SNS information DB 311, the sensor data DB 312, the vehicle washing machine information DB 313, and the map information DB 314 are constructed by executing a program of a database management system (DBMS) by means of the processor 31 thereby to manage the data stored in the auxiliary storage unit 33. The SNS information DB 311, the sensor data DB 312, the vehicle washing machine information DB 313, and the map information DB 314 are, for example, relational databases.

Any of the functional components of the server 30 or a part of the processing thereof may be executed by another computer connected to the network N1.

The SNS information obtaining unit 301 manages posting of users to the SNS. Hereinafter, the information about the posting of the users to the SNS is also referred to as "SNS information". The SNS information includes an SNS account of each user, information on a position at which the posting is performed, information about the content of the posting, and a vehicle ID that is an identifier unique to the vehicle 10 on which the user is riding. The SNS account of a user is given to the user by the server 30 in advance, and is stored, for example, in the auxiliary storage unit 23 of the user terminal 20 of the user. The information on the posted location is information obtained by the location information sensor 27 of the user terminal 20. The information on the content of the post is information inputted to the input unit 24 of the user terminal 20 by the user. For example, the user terminal 20 may obtain the vehicle ID from the in-vehicle device 100 by performing short-range wireless communication between the user terminal 20 and the in-vehicle device 100, or the vehicle ID corresponding to the SNS account of the user may have been registered in the server 30 in advance by the user. When the SNS information is obtained, the SNS information obtaining unit 301 stores the SNS information in the SNS information DB 311 which will be described later.

The sensor data obtaining unit 302 acquires sensor data at the time of vehicle washing from the in-vehicle device 100. The sensor data includes, for example, image data, sound data, or vibration data. The image data is obtained by the camera 18 of the in-vehicle device 100. In addition, the sound data is obtained by the microphone 19 of the in-vehicle device 100. The vibration data is obtained by the vibration sensor 41 of the in-vehicle device 100. It should be noted that other sensor data capable of specifying the types of the vehicle washing machines or the like may be obtained. The sensor data is transmitted from the in-vehicle device 100 together with the vehicle ID and the position information of the vehicle 10. When obtaining the sensor data, the sensor data obtaining unit 302 stores the obtained sensor data in the sensor data DB 312 which will be described later.

The vehicle washing machine information generation unit 303 generates information related to vehicle washing machines (hereinafter, also referred to as "vehicle washing machine information") from the SNS information or the sensor data. The vehicle washing machine information includes at least information on the positions of the vehicle washing machines and information on the types of the vehicle washing machines, and may further include information on the evaluation of the vehicle washing machines.

The vehicle washing machine information generation unit 303 extracts from the SNS information DB 311 the posts that include the information related to vehicle washing machines. At this time, for example, posts including a keyword such as "vehicle washing place", "vehicle washing machine", or "vehicle washing" may be extracted. Alternatively, a specific keyword for evaluating vehicle washing machines may have been determined in advance, and posts including that keyword may be extracted. The vehicle washing machine information generation unit 303 assigns a vehicle washing machine ID to each extracted post. The vehicle washing machine ID is identification information for specifying each vehicle washing machine.

The position information stored in the SNS information DB 311 can be used as the information on the position of each vehicle washing machine. Here, note that the information on the position of each vehicle washing machine may include information on the name of a shop or the address of a shop included in each post. Alternatively, the position information corresponding to a vehicle ID associated with an SNS account may be obtained from the sensor data DB 312.

The vehicle washing machine information generation unit 303 extracts information on the type of a vehicle washing machine, for example, from a post to the SNS. The information on the type of a vehicle washing machine is, for example, information on whether a vehicle is washed by using a brush or using water pressure, information on the type of the brush, information on whether the vehicle washing machine is of a drive-through type or a gate type, information on whether vehicle washing is carried out by using water or hot water, information on the type of detergent, information on the type of wax, information on the price, or the like. For example, in cases where a post includes the model of a vehicle washing machine, the type of the vehicle washing machine can be specified from the post. In addition, the vehicle washing machine information generation unit 303 may specify the type of a vehicle washing machine based on a keyword (e.g., a manufacturer, a type of brush, or the like) indicating a feature of the vehicle washing machine included in the post.

The vehicle washing machine information generation unit 303 extracts information on the evaluation of each vehicle washing machine, for example, from posts to the SNS. The evaluation of each vehicle washing machine may be, for example, the impression of the user, or the evaluation may be indicated by a score, or the evaluation may be indicated by the number of stars, or the evaluation may be indicated by either "good" or "bad". Also, items to be inputted or entered at the time of evaluating each vehicle washing machine may be determined in advance. After generating the vehicle washing machine information, the vehicle washing machine information generation unit 303 stores the vehicle washing machine information thus generated in the vehicle washing machine information DB 313.

Here, note that the vehicle washing machine information generation unit 303 may generate the information on the type of each vehicle washing machine or the information on the evaluation of each vehicle washing machine based on the sensor data stored in the sensor data DB 312. The vehicle washing machine information generation unit 303 can specify, for example, the type, feature or the like of each vehicle washing machine based on the image data, the sound data, or the vibration data.

For example, the vehicle washing machine information generation unit 303 extracts sensor data corresponding to a post related to a vehicle washing machine from the sensor data DB 312. At this time, it extracts sensor data having the same vehicle ID and position information as those of the post related to the vehicle washing machine. Then, the type of the vehicle washing machine is specified based on the sensor data. For example, the type of the vehicle washing machine can be specified by comparing the image data of the appearance of the vehicle washing machine with the image data of vehicle washing machines that have been stored in the auxiliary storage unit 33. In addition, it is also possible to specify the type of brush or the like, for example, based on the image data of the vehicle washing machine. Moreover, for example, the vibration pattern of the vehicle washing machine at the time of vehicle washing becomes a pattern corresponding to the type of the vehicle washing machine, and hence, the type of the vehicle washing machine can be specified based on the vibration data transmitted from the in-vehicle device 100, by measuring a vibration pattern in advance for each type of vehicle washing machines and storing the vibration pattern in the auxiliary storage unit 33. Further, for example, the sound generated from the vehicle washing machine at the time of vehicle washing becomes a sound according to the type of the vehicle washing machine, and hence, the type of the vehicle washing machine can be specified based on the sound data transmitted from the in-vehicle device 100 by measuring a sound in advance for each type of vehicle washing machines and storing the sound in the auxiliary storage unit 33. By combining a plurality of the image data, the sound data, and the vibration data, it is possible to enhance the accuracy of specifying the type of the vehicle washing machine.

In addition, the vehicle washing machine information generation unit 303 may generate information on the evaluation of the vehicle washing machine based on the sensor data. For example, the amount of water used for vehicle washing can be specified based on image data or sound data during vehicle washing. It is considered that as the amount of water used increases, the vehicle 10 is less likely to be damaged, and hence, the evaluation of the vehicle washing machine may be made higher.

The providing unit 304 publishes, on the SNS, information on the position of each vehicle washing machine, the type of each vehicle washing machine, and the like. For example, in response to a request from the user terminal 20, the providing unit 304 may generate a command for displaying the position of each vehicle washing machine on a map, and transmit it to the user terminal 20. This command also includes a command for displaying the type of each vehicle washing machine on the map. Here, note that the information to be transmitted to the user terminal 20 may be limited to, for example, information on vehicle washing machines located within a predetermined distance from the current location of the user terminal 20. The predetermined distance may be, for example, a maximum value of the distance that the user moves to wash the vehicle, or may be a distance in a range displayed on the display 25 of the user terminal 20.

Now, the structure of the SNS information stored in the SNS information DB 311 will be described based on FIG. 4. FIG. 4 is a diagram illustrating an example of a table structure of the SNS information. The SNS information table includes fields of SNS accounts, locations, posts, and vehicle IDs. In the SNS account fields, information on an SNS account of each user is inputted or entered. In the position fields, information on a position at which each user has posted information on a vehicle washing machine is entered. It may be considered that the position at which a user has posted about a vehicle washing machine is the same as the position of this vehicle washing machine. The information on this position is, for example, the position information detected by the position information sensor 27 of the user terminal 20 of a user when the user has posted to the SNS. In the post fields, information on a content posted by each user to the SNS is entered. In the vehicle ID fields, a vehicle ID associated with each SNS account is entered. When a vehicle ID is not associated with any SNS account, its vehicle ID field may be blank.

Next, the structure of the sensor data DB 312 will be described based on FIG. 5. FIG. 5 is a diagram illustrating an example of a table structure of sensor data. A sensor data table includes fields of vehicle IDs, positions, and sensor data. Identification information of each vehicle 10 is entered in the vehicle ID fields. In the position fields, information on the position at which each in-vehicle device 100 has transmitted sensor data is entered. The position at which each in-vehicle device 100 has transmitted sensor data may be considered to be the same as the position of a vehicle washing machine. The information on the position is, for example, position information detected by the position information sensor 17 of each in-vehicle device 100 at the time when the in-vehicle device 100 transmits sensor data. In the sensor data fields, the sensor data transmitted from each in-vehicle device 100 is entered. This sensor data is sensor data during vehicle washing.

Next, the structure of the vehicle washing machine information stored in the vehicle washing machine information DB 313 will be described based on FIG. 6. FIG. 6 is a diagram illustrating an example of a table structure of the vehicle washing machine information. A vehicle washing machine information table includes fields of vehicle washing machine IDs, positions, types, and evaluations. Identification information for specifying each vehicle washing machine is entered in washing machine ID fields. The vehicle washing machine IDs are given by the vehicle washing machine information generation unit 303 as described above. In the position fields, the position information of each user terminal 20 by which a post related to a vehicle washing machine is made is entered. The position information of each vehicle 10 may be used instead of the position information of each user terminal 20. In the type fields, information on the type of each vehicle washing machine is entered. In the evaluation fields, information on the evaluation of the vehicle washing machine posted by each user to the SNS or information on the evaluation of the vehicle washing machine generated from the sensor data is entered.

The map information DB 314 stores map information including map data and POI (point of interest) information such as characters (texts) and photographs indicating characteristics (or features) of each point or spot on the map data. Here, note that the map information DB 314 may be provided from another system such as, for example, a GIS (Geographic Information System), connected to the network N1.

Figure 7:
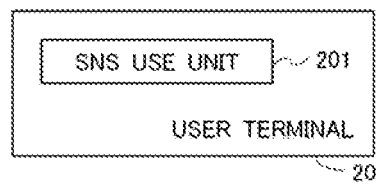
FIG. 7 is a view illustrating an example of a functional configuration of the user terminal.

Then, the function of the user terminal 20 will be described. FIG. 7 is a view illustrating an example of a functional configuration of the user terminal 20. The user terminal 20 includes an SNS use unit 201 as a functional component. The processor 21 of the user terminal 20 executes the processing of the SNS use unit 201 by means of a computer program on the main storage unit 22. However, the SNS use unit 201 or a part of the processing thereof may be executed by a hardware circuit.

The SNS use unit 201 causes the display 25 to display an operation screen, and transmits information corresponding to an input to the input unit 24 by the user to the server 30. For example, the SNS use unit 201 displays an operation screen for the SNS or the like on the touch panel display, and in cases where the user makes some input on the operation screen or the like, the SNS use unit 201 transmits information corresponding to the input to the server 30. For example, the user can submit a post about the fact that he or she has used a vehicle washing machine, a post about the type of the vehicle washing machine, and a post about the evaluation of the vehicle washing machine. When transmitting an SNS post, the SNS use unit 201 obtains position information from the position information sensor 27, and transmits this position information together with the post.

In addition, the SNS use unit 201 can cause the display 25 to display the position and the like of each vehicle washing machine published on the SNS. In cases where a predetermined input has been made by a user so that a map indicating the position of each vehicle washing machine or the like is displayed on the display 25, the SNS use unit 201 requests the server 30 to provide vehicle washing machine information. Then, when the server 30 transmits provision information in response to the request, the SNS use unit 201 causes the display 25 to display information on the position or the like of each vehicle washing machine included in the provision information.

Figure 8:
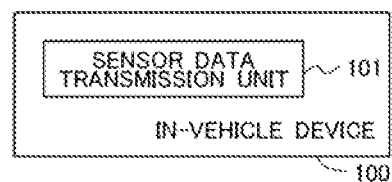
FIG. 8 is a view illustrating an example of a functional configuration of the in-vehicle device.

Next, the function of the in-vehicle device 100 of the vehicle 10 will be described. FIG. 8 is a view illustrating an example of a functional configuration of the in-vehicle device 100. The in-vehicle device 100 includes a sensor data transmission unit 101 as a functional component. The processor 11 of the in-vehicle device 100 executes the processing of the sensor data transmission unit 101 by a computer program on the main storage unit 12. However, the sensor data transmission unit 101 or a part of the processing thereof may be executed by a hardware circuit.

The sensor data transmission unit 101 transmits sensor data to the server 30 via the communication unit 16. The sensor data is data capable of specifying the type of a vehicle washing machine or the like. The sensor data includes, for example, image data obtained by the camera 18, sound data obtained via the microphone 19, or vibration data obtained via the vibration sensor 41. Here, note that in the present embodiment, the type or the like of the vehicle washing machine is specified based on the image data, the sound data, or the vibration data, but the type or the like of the vehicle washing machine may be specified based on data of another sensor.

The sensor data transmission unit 101 collects sensor data to be transmitted to the server 30 when vehicle washing by the vehicle washing machine is started. For example, it may be determined, based on the image data, the sound data or the vibration data, whether or not the washing of the vehicle by the vehicle washing machine was started, or it may be determined that the vehicle washing by the vehicle washing machine was started, when a predetermined input was made by the user to the input unit 14 of the in-vehicle device 100. For example, the sensor data at the time when the vehicle washing by the vehicle washing machine is started or when the vehicle washing by the vehicle washing machine is being performed has been stored in advance in the auxiliary storage unit 23, and by comparing newly obtained sensor data with the stored sensor data, it is possible to determine whether or not the vehicle washing by the vehicle washing machine was started. The sensor data transmission unit 101 collects image data, sound data, or vibration data during the vehicle washing by the vehicle washing machine, and transmits the data thus collected to the server 30. Here, note that a period of time to collect these sensor data may be, for example, is a time period until the vehicle washing by the vehicle washing machine is finished, or until a predetermined amount of time capable of specifying the type or the like of the vehicle washing machine has elapsed. For example, based on the data, the sound data or the vibration data, it may be determined whether or not the vehicle washing by the vehicle washing machine has been completed, or when there is a predetermined input from the user to the input unit 14 of the in-vehicle device 100, it may be determined that the vehicle washing by the vehicle washing machine has been completed.

Figure 9:
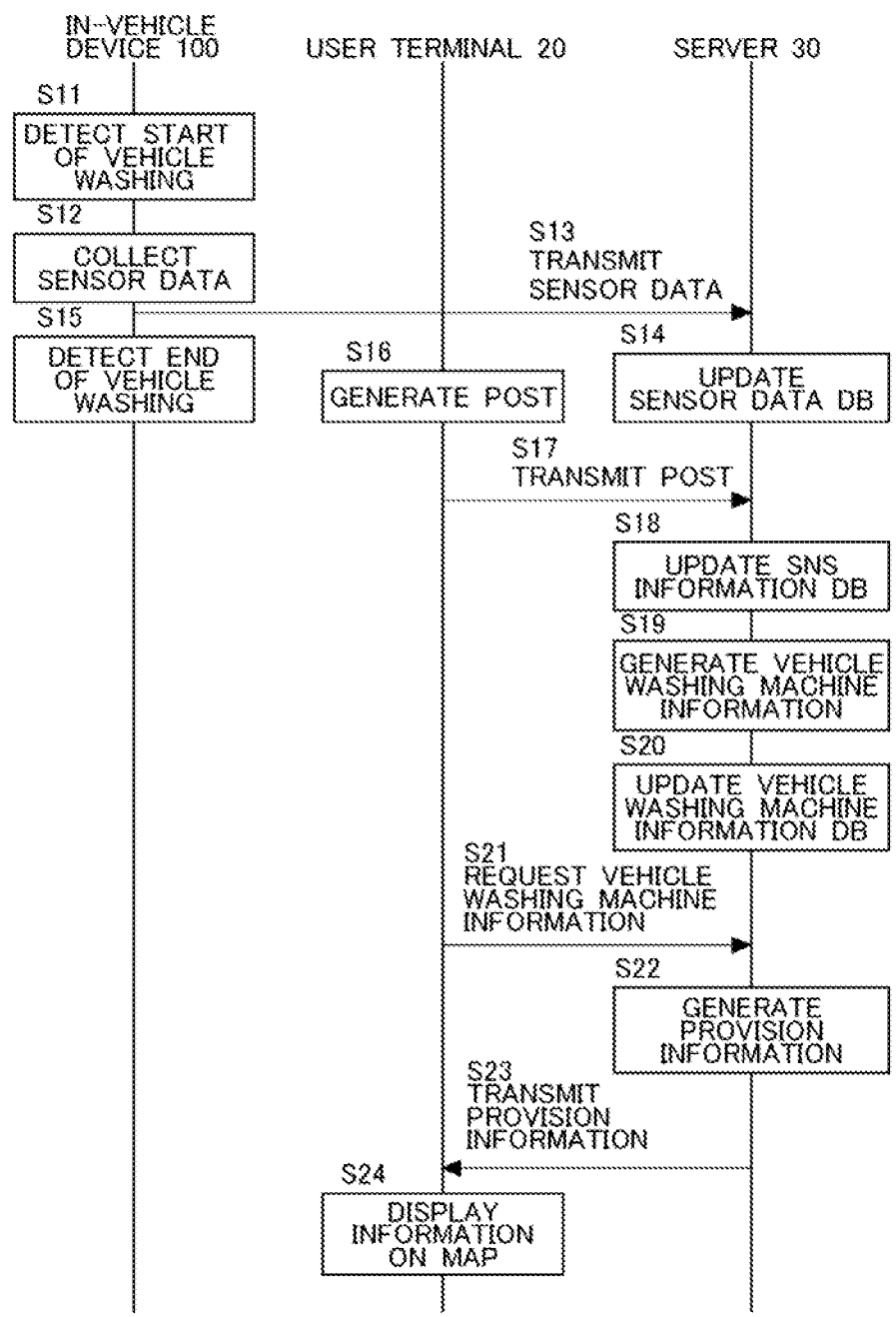
FIG. 9 is a sequence diagram of the entire system.

Now, the processing of the entire system 1 will be described. FIG. 9 is a sequence diagram of the entire system 1. In FIG. 9, when the in-vehicle device 100 detects the start of vehicle washing by a vehicle washing machine (S11), the in-vehicle device 100 collects sensor data (S12). The sensor data thus collected is transmitted to the server 30 together with the vehicle ID and the position information (S13) of the in-vehicle device 100, and the server 30, which has received the sensor data, updates the sensor data DB 312 (S14). The transmission of the sensor data from the in-vehicle device 100 is performed, for example, until the end of the vehicle washing is detected in the in-vehicle device 100. Here, note that the sensor data may be transmitted to the server 30 at any time during the vehicle washing, or may be transmitted to the server 30 in a batch after the end of the vehicle washing is detected.

In the user terminal 20, a post (or contribution) related to the vehicle washing machine is generated based on the input of the user (S16). The post thus generated is transmitted to the server 30 (S17). The server 30 receiving the post updates the SNS information DB 311 (S18). Based on the information stored in the SNS information DB 311 or the information stored in the sensor data DB 312, the server 30 specifies the type of the vehicle washing machine, extracts the evaluation of the vehicle washing machine, and generates vehicle washing machine information (S19). After generating the vehicle washing machine information, the server 30 updates the vehicle washing machine information DB 313 (S20).

Then, when a request for the disclosure of the vehicle washing machine information is made from the user terminal 20 (S21), the server 30 generates provision information, which is information to be provided to the user terminal 20 (S22). The provision information is, among the vehicle washing machine information, information indicating the location and the type of each vehicle washing machine within a predetermined distance from the current location of the user terminal 20, or information indicating the location and the type of each vehicle washing machine located within the range of a map displayed on the display 25 of the user terminal 20. The current location of the user terminal 20 or the range of the map displayed on the display 25 of the user terminal 20 is provided from the user terminal 20. The server 30, which has generated the provision information, transmits it to the user terminal 20 (S23). Then, in the user terminal 20, the position and the like of each vehicle washing machine are displayed on the map (S24).

Figure 10:
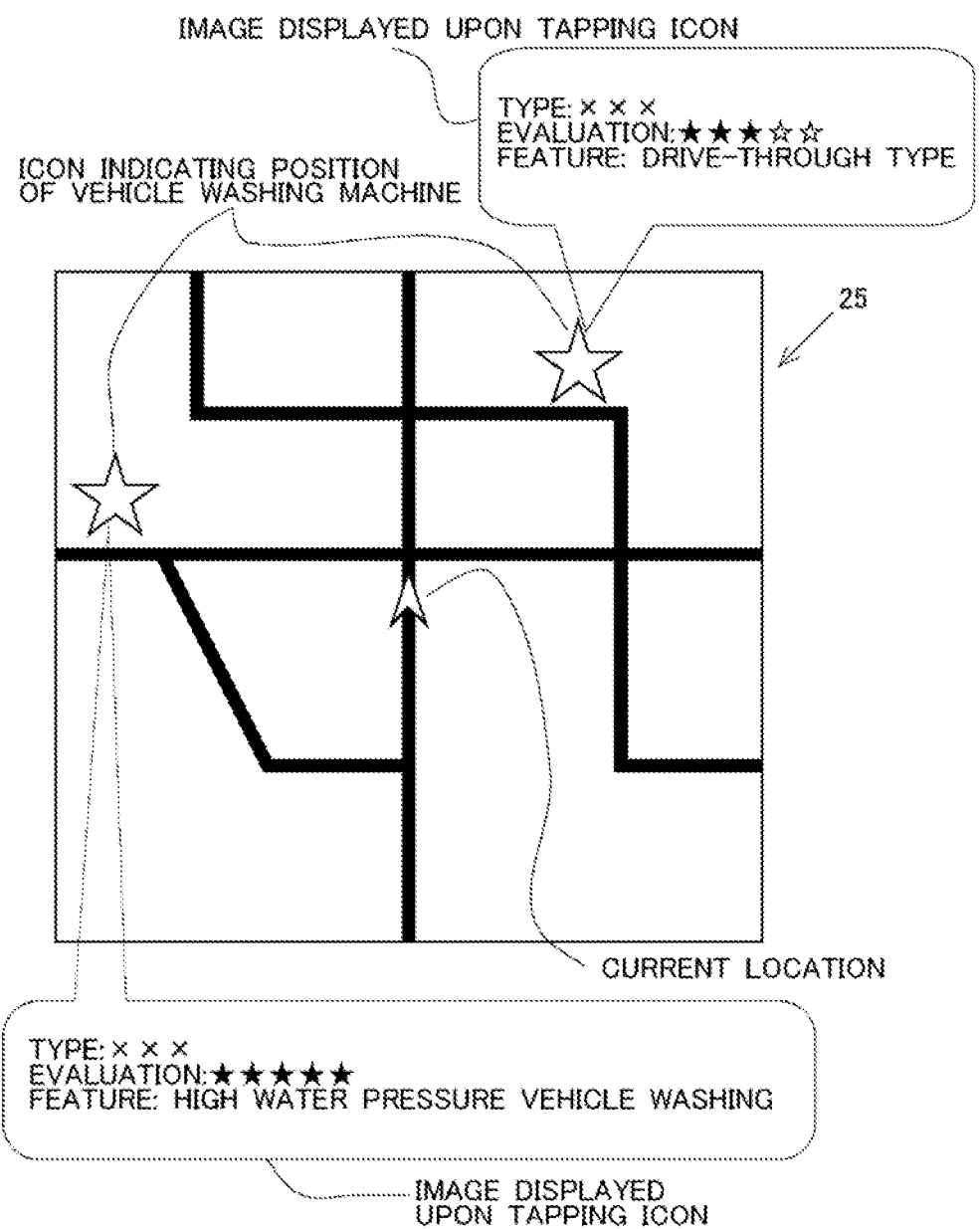
FIG. 10 is a view illustrating an example of a map displayed on a display of the user terminal.

FIG. 10 is a view illustrating an example of the map displayed on the display 25 of the user terminal 20. FIG. 10 is an example illustrating the positions and the like of vehicle washing machines displayed on the map based on the provision information transmitted from the server 30. A road map of a predetermined area around the user terminal 20 is displayed on the display 25, and an icon indicating the current location of the user terminal 20 is shown substantially at the center of the map. In addition, an icon corresponding to each vehicle washing machine is displayed at a position on the map where each user has made a post about the vehicle washing machine. By viewing the information displayed on the display 25 in this way, the user can know, on the map, the position where each vehicle washing machine is located. In the example illustrated in FIG. 10, when the user taps an icon displayed on the display 25, for example, the model, evaluation, feature, and the like of a corresponding vehicle washing machine are displayed. Here, note that icons indicating the positions of the vehicle washing machines may be different from one another depending on the types or evaluations of the vehicle washing machines.

Figure 11:
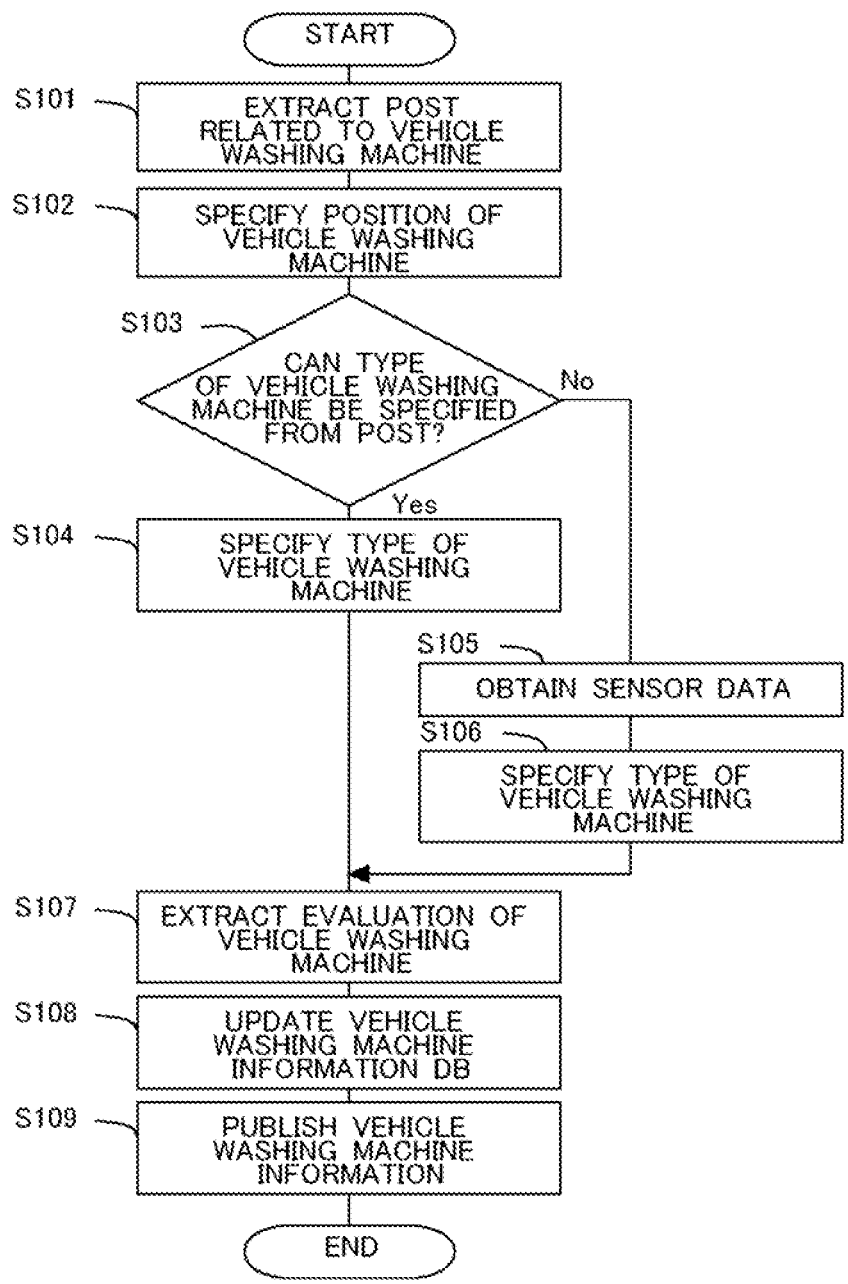
FIG. 11 is a flowchart of provision processing according to the embodiment.

Next, provision processing, which is the processing of providing the vehicle washing machine information on the SNS by means of the server 30, will be described. FIG. 11 is a flowchart of the provision processing according to the present embodiment. The provision processing illustrated in FIG. 11 is repeatedly executed in the server 30 at predetermined time intervals. Here, note that it is assumed that necessary information has already been stored in the SNS information DB 311 and the sensor data DB 312.

In step S101, the vehicle washing machine information generation unit 303 extracts posts related to vehicle washing machines from the posts stored in the SNS information DB 311. In step S102, the vehicle washing machine information generation unit 303 specifies the positions of the vehicle washing machines by extracting the position information corresponding to the extracted posts. Then, in step S103, the vehicle washing machine information generation unit 303 determines whether or not the types of the vehicle washing machines can be specified from the extracted posts. For example, the vehicle washing machine information generation unit 303 determines whether or not the posts include keywords capable of specifying the types of the vehicle washing machines. In cases where an affirmative determination is made in step S103, the processing proceeds to step S104, whereas in cases where a negative determination is made, the processing proceeds to step S105.

In step S104, the vehicle washing machine information generation unit 303 specifies the types of the vehicle washing machines. For example, the vehicle washing machine information generation unit 303 specifies the types of the vehicle washing machines according to the keywords included in the posts. The relation between the keywords and the types of the vehicle washing machines has been stored in advance in the auxiliary storage unit 33. On the other hand, in step S105, the vehicle washing machine information generation unit 303 obtains sensor data corresponding to the extracted posts from the sensor data DB 312. Then, in step S106, the vehicle washing machine information generation unit 303 specifies the types of the vehicle washing machines. The relation between the types of the vehicle washing machines and the sensor data has been stored in advance in the auxiliary storage unit 33.

In step S107, the vehicle washing machine information generation unit 303 extracts the evaluation of the vehicle washing machines from the posts to the SNS. The vehicle washing machine information generation unit 303 extracts the evaluation of the vehicle washing machines, for example, by extracting a predetermined keyword from the posts extracted in step S101. Here, note that the evaluation of the vehicle washing machines may be performed by a score or the number of stars. In this case, the vehicle washing machine information generation unit 303 may extract the score or the number of stars as the evaluation. In step S107, the evaluation of the vehicle washing machines may be generated based on the sensor data.

In step S108, the vehicle washing machine information generation unit 303 generates the vehicle washing machine information based on the specified types of the vehicle washing machines or the like, and stores the vehicle washing machine information in the vehicle washing machine information DB 313, thereby updating the vehicle washing machine information DB 313. Then, in step S109, the providing unit 304 publishes the vehicle washing machine information on the SNS. For example, the providing unit 304 plots the positions of the vehicle washing machines on a map published on the SNS. When a request to use the vehicle washing machine information is made from the user terminal 20, the providing unit 304 transmits information such as the position and type of each vehicle washing machine to the user terminal 20. Therefore, the user using the SNS can view the position, the type and the like of each vehicle washing machine published on the SNS via the display 25 of the user terminal 20.

Figure 12:
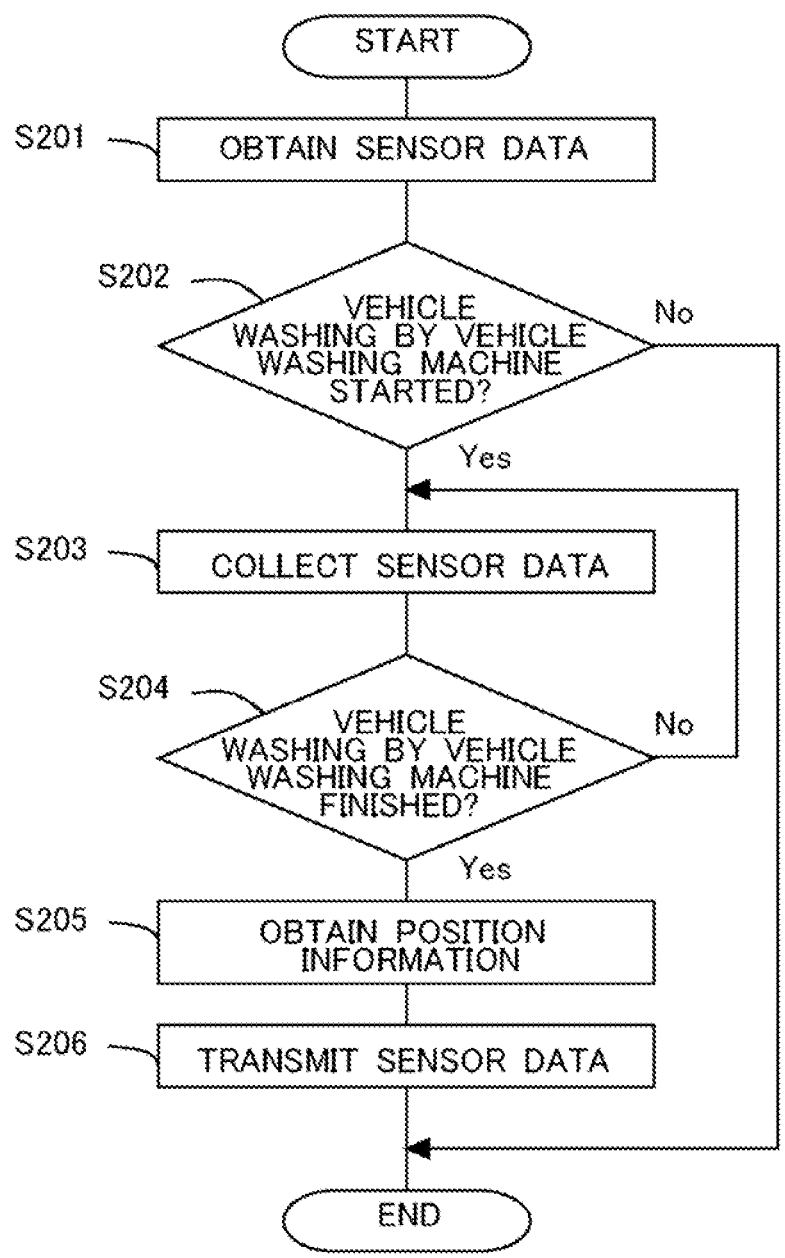
FIG. 12 is a flowchart of the processing executed by an SNS account transmission unit according to the embodiment.

Next, the processing of transmitting sensor data by means of the in-vehicle device 100 will be described. FIG. 12 is a flowchart of processing in which the in-vehicle device 100 according to the present embodiment transmits sensor data. The processing illustrated in FIG. 12 is repeatedly executed by the sensor data transmission unit 101 at predetermined time intervals.

In step S201, the sensor data transmission unit 101 obtains, for example, image data, sound data, or vibration data. The sensor data obtained at this time is data that is used for determining whether or not vehicle washing by a vehicle washing machine was started. In step S202, the sensor data transmission unit 101 determines whether or not vehicle washing by a vehicle washing machine was started. The sensor data transmission unit 101 determines, based on the sensor data obtained in step S201, whether or not the vehicle washing by the vehicle washing machine was started. The sensor data at the time when the vehicle washing by the vehicle washing machine was started has been stored in advance in the auxiliary storage unit 13. Then, the sensor data transmission unit 101 compares the sensor data stored in the auxiliary storage unit 13 with the sensor data obtained in step S201, and determines that the vehicle washing by the vehicle washing machine was started, in cases where there is a predetermined degree of matching therebetween. The predetermined degree of matching may be set in consideration of the influence of an error or the like. Alternatively, the sensor data transmission unit 101 may determine that the vehicle washing by the vehicle washing machine was started, in cases where a predetermined input has been received from the user in the input unit 14 of the in-vehicle device 100. In cases where an affirmative determination is made in step S202, the processing proceeds to step S203, whereas in cases where a negative determination is made, this routine is ended.

In step S203, the sensor data transmission unit 101 collects sensor data. Note that the sensor data collected here may be the same as or different from the sensor data obtained in step S201. Then, in step S204, the sensor data transmission unit 101 determines whether or not the vehicle washing by the vehicle washing machine was finished. Whether or not the vehicle washing by the vehicle washing machine was finished is determined based on the sensor data. For example, a state in which the vehicle washing by the vehicle washing machine is not performed is detected by the sensor data, and in cases where this state continues for a predetermined period of time, it is determined that the vehicle washing by the vehicle washing machine was finished. The predetermined period of time referred to herein is a period of time in which the vehicle washing by the vehicle washing machine is considered to have been finished, and has been set in advance and stored in the auxiliary storage unit 13. As another method, the sensor data transmission unit 101 may determine that the vehicle washing by the vehicle washing machine was finished, in cases where a predetermined input has been received from the user in the input unit 14 of the in-vehicle device 100. In cases an affirmative determination is made in step S204, the processing proceeds to step S205, whereas in cases where a negative determination is made, the processing returns to step S203, where the sensor data is continuously collected.

Then, in step S205, the sensor data transmission unit 101 obtains position information from the position information sensor 17. Further, in step S206, the sensor data transmission unit 101 transmits the sensor data to the server 30 via the communication unit 16. The sensor data transmission unit 101 transmits the sensor data together with the vehicle ID and the position information to the server 30.

Figure 13:
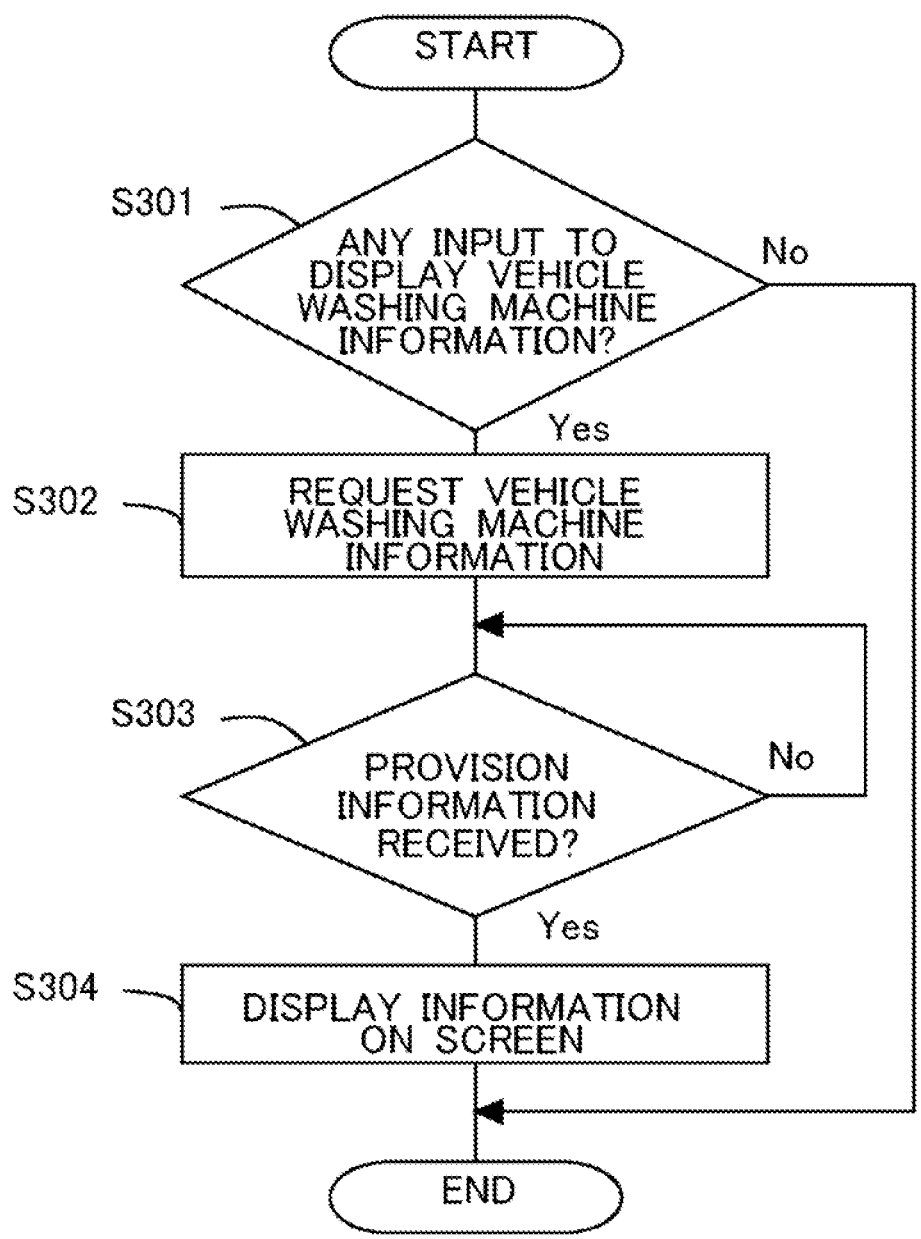
FIG. 13 is a flowchart of the processing of displaying the position of a vehicle washing machine in the user terminal according to the embodiment.

Next, the processing of displaying the position of the vehicle washing machine on the user terminal 20 will be described. FIG. 13 is a flowchart of the processing of displaying the position of the vehicle washing machine in the user terminal 20 according to the present embodiment. The processing illustrated in FIG. 13 is repeatedly executed by the SNS use unit 201 at predetermined time intervals.

In step S301, the SNS use unit 201 determines whether or not a request to display the vehicle washing machine information on the display 25 has been received from the user. For example, when the user has tapped a predetermined position on an SNS using screen displayed on the display 25, it is determined that an input to display the vehicle washing machine information has been received. The predetermined position referred to herein is, for example, a position at which an icon for activating a map indicating the position of the vehicle washing machine or the like is displayed. When an affirmative determination is made in step S301, the processing proceeds to step S302, whereas when a negative determination is made, this routine is ended.

In step S302, the SNS use unit 201 requests the vehicle washing machine information from the server 30. The SNS use unit 201 generates information on the request for the vehicle washing machine information, and transmits the information to the server 30. The information transmitted to the server 30 includes, for example, the location information of the user terminal 20 and the SNS account of the user. In step S303, the SNS use unit 201 determines whether or not provision information has been received from the server 30. In cases where an affirmative determination is made in step S303, the processing proceeds to step S304, whereas in cases where a negative determination is made, the processing of step S303 is executed again. In step S304, the SNS use unit 201 displays the position and the like of each vehicle washing machine on the map displayed on the display 25. Further, when the user taps an icon or the like displayed on the display 25, an evaluation of the vehicle washing machine corresponding to the tapped position may be displayed on the display 15, or a feature or the like of the vehicle washing machine corresponding to the tapped position may be displayed on the display 25.

As described above, according to the present embodiment, a user can know the position of a vehicle washing machine and the type of the vehicle washing machine by making use of an SNS. Thus, the user can use a vehicle washing machine suitable for the preference of the user.

Other Embodiments

The above-mentioned embodiment is merely an example, and the present disclosure can be appropriately modified and implemented within a range not departing from the spirit and scope of the present disclosure.

The processing, means, devices, units, steps and the like described in the present disclosure can be freely combined and implemented as long as no technical contradiction occurs.

Moreover, the processing(s) explained as carried out by a single device or unit may be carried out by a plurality of devices or units. Alternatively, the processing described as being performed by different devices or units may be performed by a single device or unit. In a computer system, a hardware configuration (server configuration) for realizing each function thereof can be changed in a flexible manner. For example, the server 30 may be composed of a server that manages social networking services, and a server that manages vehicle washing machine information.

In the above-mentioned embodiment, an example in which the server 30 functions as an information processing apparatus has been described, but the present disclosure is not limited to this, and the in-vehicle device 100 may function as an information processing apparatus, or the user terminal 20 may function as an information processing apparatus. In addition, the server 30, the in-vehicle device 100 and the user terminal 20 may function as an information processing apparatus in cooperation with one another.

In addition, the above-mentioned embodiment, posting from the user terminal 20 to an SNS is made, but instead of this, posting may be made from the in-vehicle device 100 to the SNS. In this case, the user may input or submit a post to the input unit 14 of the in-vehicle device 100. Alternatively, the user may input a post to the user terminal 20, and the post may be transmitted from the user terminal 20 to the in-vehicle device 100. In this case, the post may be transmitted from the in-vehicle device 100 to the user terminal 20 by means of short-range wireless communication. Also, in the above-mentioned embodiment, the sensor data is transmitted from the in-vehicle device 100 to the server 30, but instead of this, the sensor data may be transmitted from the in-vehicle device 100 to the user terminal 20, and the sensor data may be further transmitted from the user terminal 20 to the server 30. In this case, the sensor data may be transmitted from the in-vehicle device 100 to the user terminal 20 by means of short-range wireless communication.

In the above-mentioned embodiment, the position and the type of a vehicle washing machine are displayed on the display 25 of the user terminal 20, but instead of this, the position and the type of a vehicle washing machine may be displayed on the display 15 of the in-vehicle device 100. In this case, the information on the position of the vehicle washing machine and the information on the type of the vehicle washing machine may be directly transmitted from the server 30 to the in-vehicle device 100, or may be transmitted from the server 30 to the in-vehicle device 100 via the user terminal 20.

Further, in the above-mentioned embodiment, when a user taps an icon or the like indicating the position of a vehicle washing machine, an evaluation on the vehicle washing machine is displayed, but such display is not essential. That is, information indicating the position of the vehicle washing machine and the type of the vehicle washing machine may be simply displayed on a map on the display 25.

Moreover, in the above-mentioned embodiment, image data or the like at the time of vehicle washing is transmitted to the server 30 so that the type and the like of a vehicle washing machine is specified in the server 30, but instead of this, the in-vehicle device 100 may specify the type and the like of a vehicle washing machine based on sensor data, and the in-vehicle device 100 may transmit information on the specified type and the like of the vehicle washing machine to the server 30.

The present disclosure can also be achieved by supplying a computer program to a computer that implements the functions explained in the above-mentioned embodiment, and by reading out and executing the program by means of one or more processors of the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, or any type of medium suitable for storing electronic commands or instructions.

What is claimed is:

1. An information processing apparatus including a controller configured to perform:
    extracting a post related to a vehicle washing machine from posts to a social networking service; and
    transmitting, to a terminal of a user using the social networking service, information on a position of the vehicle washing machine and information on a type of the vehicle washing machine specified based on the post thus extracted, the information processing apparatus further comprising:
    a non-transitory storage medium configured to store a relation between data detected by a sensor mounted on a vehicle associated with the user and the type of the vehicle washing machine;
    wherein the controller specifies the type of the vehicle washing machine based on the data detected by the sensor mounted on the vehicle corresponding to the extracted post,
    wherein the non-transitory storage medium further stores a relation between the data detected by the sensor mounted on the vehicle and an evaluation of the vehicle washing machine, and the controller transmits the evaluation of the vehicle washing machine based on the data detected by the sensor to the terminal of the user.

2. The information processing apparatus according to claim 1, wherein the controller specifies the position of the vehicle washing machine based on position information associated with the extracted post.

3. The information processing apparatus according to claim 1, wherein the controller specifies the position of the vehicle washing machine based on position information of a vehicle that is associated with the user and corresponds to the extracted post.

4. The information processing apparatus according to claim 1, wherein the controller specifies the type of the vehicle washing machine based on information on the type of the vehicle washing machine included in the extracted post.

5. The information processing apparatus according to claim 1, wherein the sensor is a camera, and the controller specifies the type of the vehicle washing machine based on an image photographed by the camera.

6. The information processing apparatus according to claim 1, wherein the sensor is a vibration sensor, and the controller specifies the type of the vehicle washing machine based on a detection value of the vibration sensor.

7. The information processing apparatus according to claim 1, wherein the sensor is a microphone for detecting sound, and the controller specifies the type of the vehicle washing machine based on a detection value of the microphone.

8. The information processing apparatus according to claim 1, wherein the controller transmits the evaluation of the vehicle washing machine generated based on the extracted post to the terminal of the user.

9. The information processing apparatus according to claim 1, wherein the controller transmits, to the terminal of the user, a command to display the position of the vehicle washing machine and the type of the vehicle washing machine on a map displayed on a screen of the terminal of the user.

10. A system comprising:
a terminal of a user capable of using a social networking service; and
a server with a controller configured to manage the social networking service, wherein the controller includes a memory and a processor;
a vehicle associated with the user and having a sensor mounted thereon,
wherein the controller performs:
extracting a post related to a vehicle washing machine from posts submitted from the terminal of the user to the social networking service; and
transmitting, to the terminal of the user using the social networking service, information on a position of the vehicle washing machine and information on a type of the vehicle washing machine specified based on the post thus extracted,
wherein the server further comprises a non-transitory storage medium configured to store a relation between data detected by the sensor and the type of the vehicle washing machine; and
the controller specifies the type of the vehicle washing machine based on the data detected by the sensor mounted on the vehicle corresponding to the extracted post,
wherein the non-transitory storage medium further stores a relation between the data detected by the sensor mounted on the vehicle and an evaluation of the vehicle washing machine; and
the controller transmits, to the terminal of the user, the evaluation of the vehicle washing machine based on the data detected by the sensor.

11. The system according to claim 10, wherein the controller specifies the position of the vehicle washing machine based on position information associated with the extracted post.

12. The system according to claim 10, wherein the controller specifies the position of the vehicle washing machine based on position information of a vehicle that is associated with the user and corresponds to the extracted post.

13. The system according to claim 10, wherein the controller specifies the type of the vehicle washing machine based on information on the type of the vehicle washing machine included in the extracted post.

14. The system according to claim 10, wherein the controller transmits, to the terminal of the user, the evaluation of the vehicle washing machine generated based on the extracted post.

15. The system according to claim 10, wherein the controller transmits, to the terminal of the user, a command to display the position of the vehicle washing machine and the type of the vehicle washing machine on a map displayed on a screen of the terminal of the user.

* * * * *